United States Patent
Piantedosi

(10) Patent No.: US 11,670,152 B2
(45) Date of Patent: Jun. 6, 2023

(54) ALARM NOTIFICATION SYSTEM

(71) Applicant: Avery Piantedosi, Melbourne Beach, FL (US)

(72) Inventor: Avery Piantedosi, Melbourne Beach, FL (US)

(*) Notice: Subject to any disclaimer, the term of this patent is extended or adjusted under 35 U.S.C. 154(b) by 89 days.

(21) Appl. No.: 15/735,106

(22) PCT Filed: Jun. 10, 2016

(86) PCT No.: PCT/US2016/037094
§ 371 (c)(1),
(2) Date: Dec. 8, 2017

(87) PCT Pub. No.: WO2016/201376
PCT Pub. Date: Dec. 15, 2016

(65) Prior Publication Data
US 2019/0371151 A1    Dec. 5, 2019

Related U.S. Application Data

(60) Provisional application No. 62/173,397, filed on Jun. 10, 2015.

(51) Int. Cl.
*G08B 1/08* (2006.01)
*G08B 21/04* (2006.01)
(Continued)

(52) U.S. Cl.
CPC ..... *G08B 21/0415* (2013.01); *G08B 21/0453* (2013.01); *G08B 25/001* (2013.01);
(Continued)

(58) Field of Classification Search
CPC ............ G08B 21/0415; G08B 21/0453; G08B 25/001; G08B 25/012; G08B 25/10; H04W 4/90; H04W 4/14
See application file for complete search history.

(56) References Cited

U.S. PATENT DOCUMENTS 6,175,329 B1 * 1/2001 Vicci ................... G08B 25/016
                                                342/357.55
7,076,235 B2 * 7/2006 Esque .................. H04W 76/50
                                                455/404.1

(Continued)

FOREIGN PATENT DOCUMENTS

WO   WO2014100893   7/2014

OTHER PUBLICATIONS

NoJitter, Understanding Enterprise E911 (Year: 2009).*
(Continued)

*Primary Examiner* — Quang Pham
(74) *Attorney, Agent, or Firm* — Lowndes; Stephen C. Thomas

(57) ABSTRACT

A system and method providing for ascertaining the status of a user and escalating an alarm in the event the user is ascertained to be disposed in a dangerous condition. The of the invention attempts to contact the user at a predetermined check-in time, and notifies a pre-designated third-party which may be an emergency responder such as law enforcement or other emergency contact in the event that the user fails to respond to the check in request or signals that they are in danger using an escalate feature of the invention. The system operates autonomously to notify pre-designated emergency contacts or emergency responders in the case in which a user has been rendered unable to respond. The user may identify specific individuals with whom they plan to meet and the invention may also track the user's geo-location. The invention may also monitor biometric data of the user.

25 Claims, 12 Drawing Sheets

(51) Int. Cl.
*H04W 4/90* (2018.01)
*G08B 25/00* (2006.01)
*G08B 25/01* (2006.01)
*G08B 25/10* (2006.01)
*H04W 4/14* (2009.01)

(52) U.S. Cl.
CPC ........ *G08B 25/012* (2013.01); *G08B 25/10* (2013.01); *H04W 4/90* (2018.02); *H04W 4/14* (2013.01)

(56) References Cited

U.S. PATENT DOCUMENTS

| | | | | |
|---|---|---|---|---|
| 7,224,956 B1* | | 5/2007 | O'Neil | H04W 76/50 455/404.1 |
| 7,629,891 B1* | | 12/2009 | Bell | G08B 21/0415 340/506 |
| 7,831,235 B2* | | 11/2010 | Mononen | G08B 21/0415 455/403 |
| 7,855,935 B1* | | 12/2010 | Lauder | G01S 3/80 367/128 |
| 7,880,610 B2* | | 2/2011 | Tanner | G07C 9/27 340/572.1 |
| 7,928,851 B2* | | 4/2011 | Stanners | G08B 25/016 340/539.11 |
| 8,116,723 B2* | | 2/2012 | Kaltsukis | H04M 11/04 455/403 |
| 8,116,724 B2* | | 2/2012 | Peabody | G08B 25/001 455/457 |
| 8,170,525 B2* | | 5/2012 | Martin | H04W 76/50 455/414.1 |
| 8,515,452 B2* | | 8/2013 | Craine | B60R 25/1004 455/418 |
| 8,548,422 B2* | | 10/2013 | Jenkins | H04M 11/045 379/38 |
| 8,554,170 B2* | | 10/2013 | Franz | H04W 4/14 455/564 |
| 8,706,093 B2* | | 4/2014 | Dove | G06Q 10/10 455/414.1 |
| 8,761,720 B2* | | 6/2014 | Ray | H04W 76/50 455/456.3 |
| 8,909,248 B2* | | 12/2014 | Phillips | G08B 21/0236 455/414.1 |
| 8,918,075 B2* | | 12/2014 | Maier | H04W 4/025 370/352 |
| 8,924,676 B1* | | 12/2014 | Anderson | G06F 12/0646 711/112 |
| 9,342,976 B2* | | 5/2016 | Pfeffer | G08B 25/016 |
| 9,483,932 B2* | | 11/2016 | Amis | G08B 27/00 |
| 9,860,721 B2* | | 1/2018 | Nam | G08B 25/08 |
| 10,373,121 B2* | | 8/2019 | Chen | G06Q 10/1093 |
| 10,424,185 B2* | | 9/2019 | Cordes | G08B 25/016 |
| 11,129,010 B2* | | 9/2021 | Wickham | H04W 4/029 |
| 2002/0107927 A1* | | 8/2002 | Gallant | G08B 21/0423 709/206 |
| 2004/0180683 A1* | | 9/2004 | Dennis | H04W 4/06 455/521 |
| 2004/0248573 A1* | | 12/2004 | Wandel | H04W 24/00 455/435.1 |
| 2005/0086261 A1* | | 4/2005 | Mammone | G08B 21/0222 |
| 2005/0151642 A1* | | 7/2005 | Tupler | H04W 76/50 340/539.18 |
| 2005/0208925 A1* | | 9/2005 | Panasik | H04M 1/72421 455/404.1 |
| 2007/0167147 A1* | | 7/2007 | Krasner | G08G 1/205 455/404.2 |
| 2007/0293186 A1* | | 12/2007 | Lehmann | H04M 11/04 455/404.2 |
| 2008/0188198 A1* | | 8/2008 | Patel | G06F 21/6245 455/404.2 |
| 2008/0214142 A1* | | 9/2008 | Morin | H04M 1/72424 455/404.1 |
| 2010/0097989 A1* | | 4/2010 | Huang | H04W 4/02 370/328 |
| 2011/0288379 A1* | | 11/2011 | Wu | G16H 40/67 600/301 |
| 2011/0294457 A1* | | 12/2011 | Braznell | G08B 21/0227 455/404.1 |
| 2011/0319051 A1* | | 12/2011 | Reitnour | H04W 4/185 342/357.55 |
| 2012/0126974 A1* | | 5/2012 | Phillips | G08B 21/0236 340/539.13 |
| 2012/0246089 A1* | | 9/2012 | Sikes | G06Q 10/1093 705/325 |
| 2012/0268269 A1* | | 10/2012 | Doyle | G08B 21/22 340/539.13 |
| 2012/0329420 A1* | | 12/2012 | Zotti | H04W 4/029 455/404.2 |
| 2014/0019184 A1* | | 1/2014 | Herickhoff | G06Q 10/1095 705/7.19 |
| 2014/0248858 A1* | | 9/2014 | Soomro | G08B 3/1041 455/412.2 |
| 2014/0351958 A1* | | 11/2014 | Sabulsky | G06F 21/62 726/30 |
| 2015/0009011 A1* | | 1/2015 | Cahill | G06F 3/0488 340/7.58 |
| 2015/0031348 A1* | | 1/2015 | Lee | G06F 3/0482 455/418 |
| 2015/0112748 A1* | | 4/2015 | Kaye | H04W 4/02 705/7.19 |
| 2015/0163632 A1* | | 6/2015 | Phillips | G08B 21/0261 455/456.3 |
| 2015/0269835 A1* | | 9/2015 | Benoit | H04M 19/04 340/539.13 |
| 2015/0296360 A1* | | 10/2015 | Saito | H04W 4/90 455/404.2 |
| 2015/0346983 A1* | | 12/2015 | Adler | G06Q 10/1093 715/772 |
| 2015/0347591 A1* | | 12/2015 | Bax | G06Q 50/01 707/749 |
| 2016/0088435 A1* | | 3/2016 | Weksler | H04W 4/021 455/414.2 |
| 2016/0232773 A1* | | 8/2016 | Abeyta | H04L 51/046 |
| 2017/0099579 A1* | | 4/2017 | Ryan | H04M 3/5116 |
| 2017/0279751 A1* | | 9/2017 | Quirarte | H04L 51/08 |
| 2019/0156655 A1* | | 5/2019 | Cordes | H04W 76/50 |
| 2020/0143654 A1* | | 5/2020 | Howard | G08B 25/016 |
| 2020/0413238 A1* | | 12/2020 | Bohlander | H04W 4/90 |
| 2021/0314756 A1* | | 10/2021 | Brooks | H04W 4/029 |
| 2021/0352438 A1* | | 11/2021 | Ford | H04W 4/029 |

OTHER PUBLICATIONS

Thibault Serlet, E911 Phone Tracking and How to Troll It (Year: 2015).*
PCT International Search Report, PCT/US16/37094, dated Aug. 30, 2016.

* cited by examiner

ALARM NOTIFICATION SYSTEM

CROSS REFERENCE TO RELATED APPLICATIONS

This patent application claims the benefit of priority to U.S. patent application Ser. No. 62/173,397, entitled "ALARM NOTIFICATION SYSTEM", filed in the United States Patent and Trademark Office (USPTO) on Jun. 10, 2015, which is hereby incorporated by reference in its entirety; this patent application is also a national stage entry of International Application PCT/US16/37094, entitled "ALARM NOTIFICATION SYSTEM", which was filed in the USPTO Receiving Office on Jun. 10, 2016.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

This invention relates to the field of devices, systems and methods for personal protection. More specifically, the invention relates to the field of notification systems that may notify authorities or other designated individuals in the event a user is in personal danger, is missing, is unable to respond, has directly signaled that they are in distress or otherwise may be subject to an unsafe condition or environment.

2. Background Art

Devices that have historically been utilized for personal protection and/or notification of a designated individual or authorities in the event in which a user is subjected to a personal danger typical rely upon some positive action to be taken by the user. For example, certain devices have been suggested as personal safety devices such as whistles, handguns, spray containers containing a defensive chemicals such as Mace®, the use of cell phones to dial 911 in case of an emergency, and other like devices and systems which require affirmative action by the user if they should find themselves in a dangerous condition or environment, or under personal threat.

A significant drawback of the systems and devices of the prior art is that they require affirmative action to be taken by the user. Thus, if the user is surprised or caught unaware so as to allow an attacker to disable their ability to take the affirmative action, no distress or other signal can be communicated by the victim, leaving them in danger which may include mortal peril. This drawback of the prior art is a significant one, because there are many situations which arise in which a victim may be caught unawares and rendered unable to, for example, dial 911, signal using a whistle or other device, or reach into a purse or other container to retrieve a weapon such as a handgun or defensive chemical spray. In these situations a victim may be caught unawares, rendered defenseless, and attacked without any opportunity for the victim to signal for help. Even worse, it may be a significant period of time such as hours or days before anyone knows that the victim has encountered trouble. In such situations, by the time loved ones or authorities are aware that the victim has been subjected to a dangerous condition or situation, it may be too late to locate the victim or to render assistance in a meaningful way.

Additionally, there are other situations in which a person may be rendered defenseless and unable to make a call for help. These situations may arise, for example, in the case of elderly individuals or other physically challenged individuals living alone who suffer a medical emergency that renders them unable to call for help. In such situations, the user may not be able to activate a signaling device such as a pendant, cell phone, or other communication device to call for help. There are a significant number of medical emergencies that that may arise which could result in a user being unable to activate a signaling device. The result may be that the victim of a medical emergency may be left unattended for hours or days, even weeks, resulting in significant personal injury or even death.

There are numerous situations in which an individual may encounter personal danger, medical emergency or other conditions, environments or situations in which it would be advantageous for law enforcement, monitoring personnel, loved ones, pre-designated individuals, or other individuals to be made aware that the individual is in danger or suffering a medical emergency, without requiring the user to take affirmative action to activate a signaling device. Such situations include but are not limited to real estate professionals who may be showing properties to potential participants in real estate transaction; individuals who are alone with others in social situations such as, for example, dating; children who may be participating in events outside of their parents supervision or returning home from school while their parents are at work; elderly or physically challenged individuals who live alone or may be taking, for example, trips or extended vacations without companions; and numerous other like situations. The examples given here are not to be construed as limiting but are provided as exemplary of the numerous situation in which an individual may encounter danger and be unable to take affirmative action to signal for help. In these situations, an individual may encounter a threat to their personal safety, medical emergency, or another condition or situation in which they are rendered unable to call for help using, for example, a cell phone or other signaling device. In these situations it would be desirable that a third party could be made aware that that individual may be in a dangerous position so that help can be rendered, without the need for any affirmative action on the user's part.

The present invention overcomes the shortcomings of the prior art by providing a system and method for alerting a third party that an individual may have encountered a threat to their personal safety, or may have suffered a medical event, that has rendered them unable to call for help.

BRIEF DESCRIPTION OF THE DRAWINGS

The following figures of the drawings depict an exemplary embodiment of the system and method of the invention. As the embodiment depicted in the figures of the drawings is an exemplary embodiment, it is to be understood that all equivalent embodiments are included with the scope of the invention.

DETAILED DESCRIPTION OF THE INVENTION

Although a detailed description of exemplary embodiments of the system and method of the invention as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not by the examples given.

Figure 1:
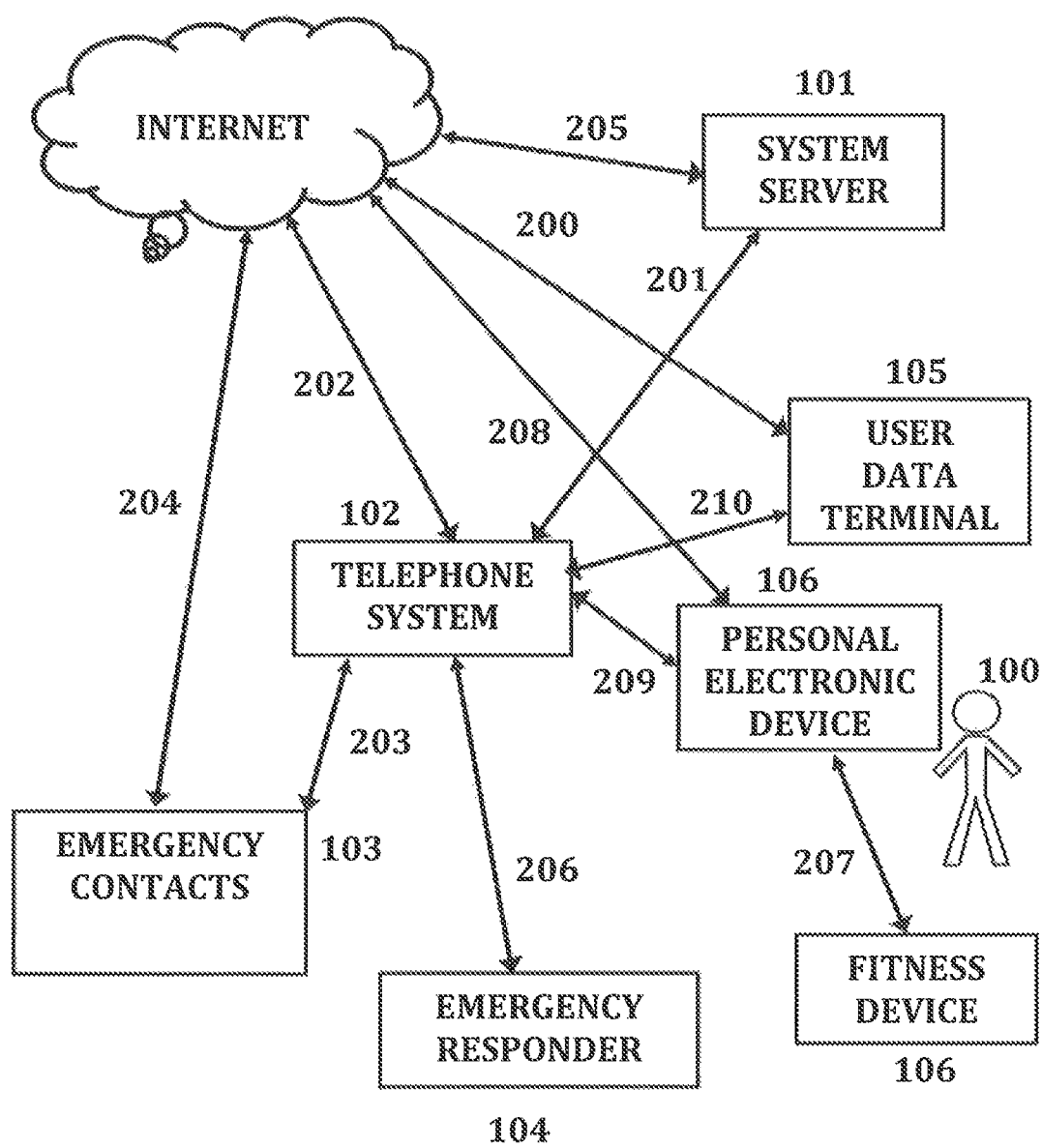
FIG. 1 depicts a system diagram of an embodiment of the personal protection system of the invention.

Referring now to FIG. 1, an exemplary embodiment of a system of the invention is depicted. A user 100 may access the system through any user data terminal 105 that is connected to the Internet by Internet connection 200.

User data terminal 105 may be any electronic device that is able receive user data entered by user 100 as described herein, and to communicate said user data with other electronic devices that are also connected to the Internet. Typically, user data terminal 105 may comprise a controller for executing non-transitory computer executable instructions stored in non-transitory computer readable media in communication with non-transitory physical computer readable media such as an electronic memory, at least one data transceiver for transmitting and receiving data and audio information on links 200 and 210, a video display, and a user data input device such as a keyboard or touchscreen. By way of example, user data terminal may be a cell phone or other mobile phone, an electronic tablet, a personal digital assistant (PDA), a computer or any other electronic device.

Personal electronic device 106 may be any electronic device that is able receive user data entered by user 100 as described herein, and to communicate said user data with other electronic devices that are also connected to the Internet. Typically, personal electronic device 106 may comprise a controller for executing non-transitory computer executable instructions stored in non-transitory computer readable media in communication with non-transitory physical computer readable media such as an electronic media, at least one data transceiver for transmitting and receiving data and audio information on links 208 and 209, a video display, and a user data input device such as a keyboard or touchscreen. A personal electronic device may also comprise a geolocation receiver, such as Global Positioning Receiver, for determining the personal electronic device's geographic location and producing an output signal containing the personal electronic device's geographic location information to the personal electronic device's geographic location controller. By way of example, user data terminal may be a cell phone, mobile phone, an electronic tablet, a personal digital assistant (PDA) or any other electronic device.

Server 101 may be any electronic device capable of connecting to the Internet and communicating with user data terminal 105 and user personal electronic device 106 via Internet connection 205, or, in the case in which user data terminal 105 or personal electronic device 106 is a mobile phone, via a telephone connection 201. Server 101 may comprise a controller for executing non-transitory computer executable instructions stored in server non-transitory computer readable media. The server non-transitory computer readable media is in communication with the server controller. Server 101 may also comprise as least one transceiver for transmitting and receiving data and telephone audio via links 201 and 205.

As used herein, "contact" means an individual with whom a user plans to meet at an event.

As used herein, "event" means a location, date and time where a user plans to meet a contact.

As used herein, "emergency contact" is a person who has been designated by the user as a person to whom the user desires to send alarms, and who is able to send and receive voice or SMS messages in response to alerts transmitted by server 101.

As used herein, "emergency responder" means an entity such as a law enforcement agency or other government entity that provides response to emergencies. An example is the United States 911 and E911 systems.

As used herein, "alert" means an attempt taken by server 101 to contact a user by transmitting an alert to the user at a predetermined check-in time.

As used herein, "check-in" means an attempt by a user 100 to respond to an alert message transmitted by server 101.

As used herein, "escalate an alarm" means the transmission of an alarm message to at least one pre-determined emergency contact or to an emergency responder, or both.

As used herein, "SMS" means Short Message Service, and is alternatively designated as "text message" herein.

As used herein, "fitness device" means a device that comprises a wireless transceiver for communication with user data terminal 105 via any data communication link 207 such as an RF or optical data link, for example Bluetooth®, WiFi IEEE 802.11, Near Field Communication (NFC) or the like.

As used herein, "event information" means any, all, or any combination of date and time of an event, geographic location of an event, user identifying indicia, or a contact's identifying indicia.

As used herein, "contact identifying indicia" means any, all, or any combination of the contact's name, the contact's photograph, the contact person's physical address, the contact person's email address, the contact's telephone number, or close associates of the contact.

As used herein, "user's identifying indicia" means any, all, or any combination of a user's name, age, physical address, email address, telephone number, photograph, or other user identifying information.

The method steps of the invention may be carried out the server, personal electronic devices and user data terminal controllers executing non-transitory computer executable instructions stored in non-transitory computer readable media in server 101, personal electronic device 106, or in user data terminal 105.

A user may utilize user data terminal 105 to access system server 101 through Internet connection 200 to perform steps of the invention described herein; for example, logging in, providing emergency contact information, entering alarm information, entering information regarding an event, which event information may include location, contact person's name and contact information, the person's photograph, the contact person's physical address, the contact person's email address or telephone number, or other information about the person. System server 101 may store this information, for example in a database comprising non-transitory computer readable media, as described below.

The invention may be carried out in one of two basic modes. In a first mode it is not necessary for a user to carry a personal electronic device, such as a cell phone, on their person. In a second mode, a user may carry a personal electronic device on their person, which allows the user to self-escalate an alarm, respond to alerts or perform other steps of the invention.

In either mode, once a user 100 has logged into the system server 101 and has provided the desired emergency contact, event, and contact information, the user may log out and proceed about their business. In an embodiment of the invention it is not necessary that the user 100 carry a cell phone or other communication device with them in order for the system and method of the invention to ascertain whether an escalation is necessary. As is seen by the description of the invention provided herein, an aspect of this embodiment of the invention is that user 100 does not need to continue Internet access or telephone access, or any other communication, with system server 101 in order for the system a method of the invention to provide its notification functions. In the first mode, once the user 100 has entered their information into system server 101, they do not need to remain in contact with the server in order for the server to perform its alarm notification functions.

In a second mode, user 100 may keep on their person a personal electronic device 106 that is able to receive global positioning signal (GPS) information from a GPS satellite constellation. Thus, in this second mode of the invention, a user may carry an electronic device that includes a geolocation function such that the user's geo-location information stored on the device. In second mode, the user's device may communicate through Internet connection 205 to system server 101 and in a second mode embodiment, monitor the geo-location of a user so that the user 100's whereabouts and last location may be logged by system server 101 and reported to an emergency contact or law enforcement in the case that an alarm escalation event occurs. Alarm escalation events are described in further detail below.

System server 101, through its Internet connection 205, may also be in communication with a telephone interface, or telco system, 102, which may communicate directly 203 or indirectly with a telephone system via communication link 203 for the purposes of communicating with at least one pre-designated emergency contact 103. Telco system 102 may also interface with telephone systems that are Internet enabled through the telco internet communication link 202. In this manner, telco system 102 is operable to place telephone calls as needed, which may occur, for example, in the instance when an alarm escalation event has occurred. In such an event, system server 101 may communicate with telco system 102 to initiate telephone calls to pre-designated contacts identified by the user as emergency contacts, should an alarm escalation event. Likewise, system server 101 may communicate with telco system 102 to initiate telephone calls to emergency responders such as law enforcement agencies 104, for example, by communication link 206, which may be any data network, landline, wireless or wired connection, including but not limited to the Internet. Telephone interface, or telco system, 102 may communicate with a law enforcement agency or other entity 104 by communicating an emergency message to an emergency response communication point. In the United States, the 911 and E911 systems are examples of emergency response communication points. In these systems, the emergency response communication point is termed a Public Safety Answering Point (PSAP). In the United States, the invention may communicate with an emergency response communication point by dialing 911, which will cause local law enforcement to respond using a 911 or Enhanced 911 (E 911) system. However, it is to be understood that the scope of the invention includes all such systems, in any country, regardless of the code used to dial the emergency response communication point, or the name by which it is called. All emergency response systems that are able to receive communication via an emergency response communication point, and to provide a resulting emergency response, are included within the scope of the invention. Emergency contacts 103 may be in communication with the Internet via communication link 204.

A user 100 may carry on their person a personal electronic device 106 that is connected to the Internet through communication link 208 and to a telephone network 102 through communication link 209. Both communication links 208 and 209 may be wireless and may be direct, or indirect, as is known in the art.

Figure 2:
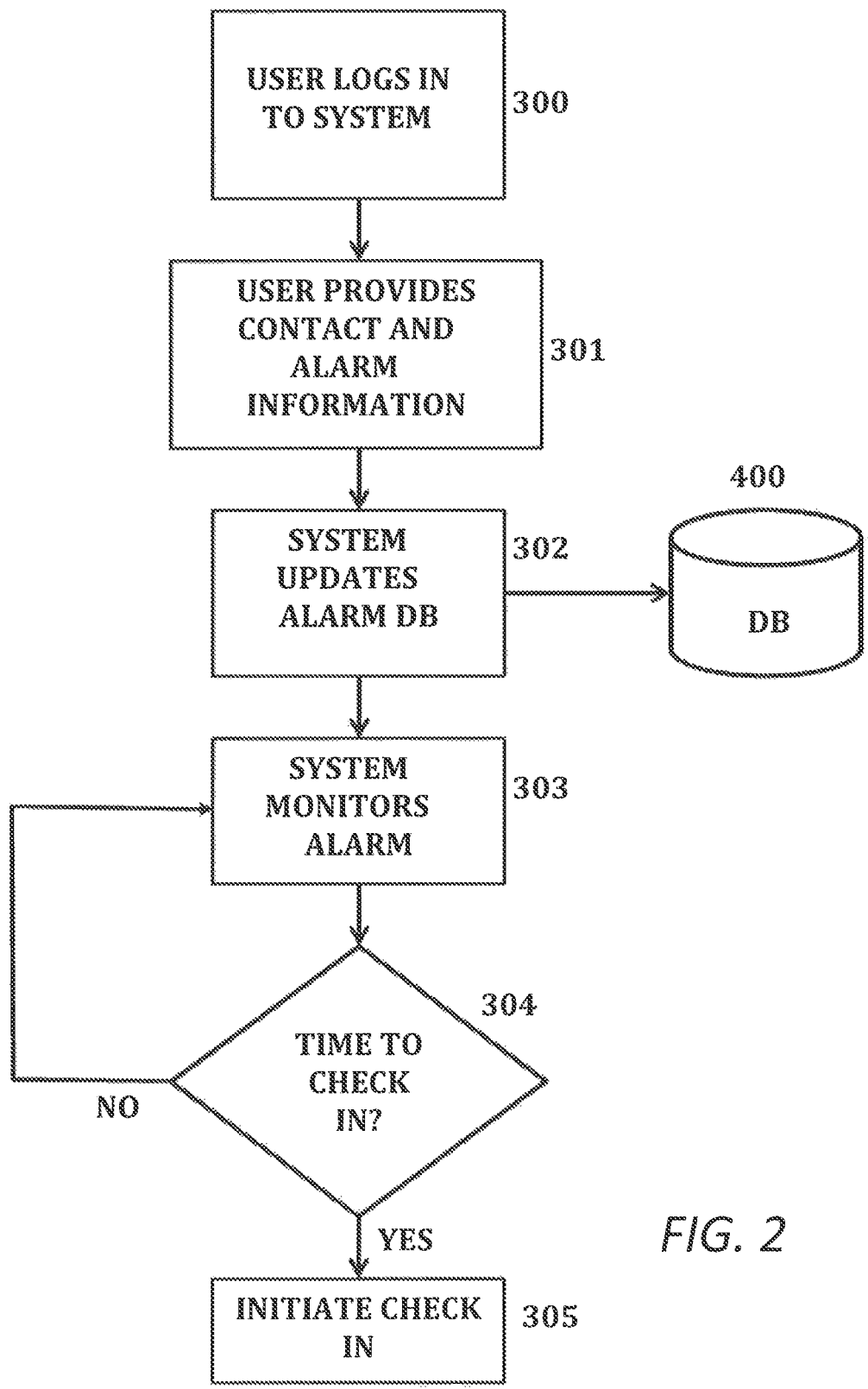
FIG. 2 depicts a flowchart of an embodiment of the system of the invention, depicting the user login step; step of user identification of alarm information contacts, plans for meetings and the like; step of updating the alarm database; step of system monitoring alarms; and the steps related to verifying whether it is time for a user to check in and initiating the check-in procedure.

Referring now to FIG. 2, a flowchart of an embodiment of the system of the invention, depicting the user login step; step of user identification of alarm information contacts, plans for meetings and the like; step of updating the alarm database; step of system monitoring alarms; and the steps related to verifying whether it is time for a user to check in and initiating the check-in procedure is depicted.

In a first step 300, a user may log into the system of the invention using login credentials that provide protection, such as password protection, the prohibit unauthorized access to a user's account but allows an user their own account for the purposes described below. Once a user has logged into the system, they may provide information to the system that will be stored by the system and utilized for the various system functions as herein described 301. The type of information provided to the system by a user may include but not be limited to:

their own identifying information such as name, address, date of birth, physical characteristics such as height and weight in color of hair, race, or any other identifying information;
  a personal identification number, or PIN;
  password for disarming; and
  alert information comprising information related to a time for the system to check in with the user; identification of persons with whom the user may be meeting which may include name, telephone number, address, identifying physical characteristics, type of car driven, license plate number, telephone number, email address and any other identifying information; description of the type of meeting; location of the meeting; description of the method that will be used by the system to perform check-in with the user, and any other information regarding alerts;
  identification of persons to be alerted in case an alarm is escalated, and the method by which those persons should be contacted; and
  any other information related to the manner in which an identity to whom alerts should be sent by the system of the invention.

In a next step 302, the system of the invention stores the information provided by user 100 by any means known in the ar. Specifically, alert information may stored in alarm database 400, which may also be stored in non-transitory computer readable media.

The method of the system of the invention may be carried out by any means known in the art. In an embodiment of the invention, the method of the invention may be carried out by non-transitory computer readable and executable instructions stored in non-transitory computer readable media that is in electrical communication with, or forms a part of, system server 101. It is not necessary that the non-transitory computer readable media be co-located with system server 101. System server 101 may comprise any system that is capable of executing computer readable instructions to perform the method steps described herein. System server 101 may further comprise communication means such as communication transceivers, which may communicate wirelessly or in wired fashion, as is known in the art, to communicate through the Internet and with the other elements of the system as identified herein. Likewise, user 100 may utilize any electronic computing device or other device to communicate with system server 101 as described herein. As an example, user 100 may use a personal computer, cell phone, tablet computer, personal digital assistant, or any other electronic means known in the art capable of communicating with the Internet via communication link 200 so that it can communicate with system server 101 to provide the steps described herein. The steps herein may be embodied in non-transitory computer readable and executable instructions implemented in a computer language such as, by way of example and not by way of limitation, JAVA. Thus, in an embodiment of the invention, the method steps described herein may be carried out in a web browser API or may be carried out in a mobile device application resident on a user's mobile computing device such as cell phone, tablet computer, or the like.

Still referring to FIG. 2, the next step 303 the system of the invention may execute instructions to read alert information from alarm database 400 such that it monitors the passing of time and compares the present time to the time allocated for check-in that has been entered by the user as hereinbefore described and stored in alarm database 400. When time arrives for the system to check in with a user 304, it initiates check-in procedure 305. If time has not yet arrived for the system to check in with the user, the system continues to monitor the passing of time and compare the present time to the time allocated for check-in that has been entered by the user.

Figure 3:
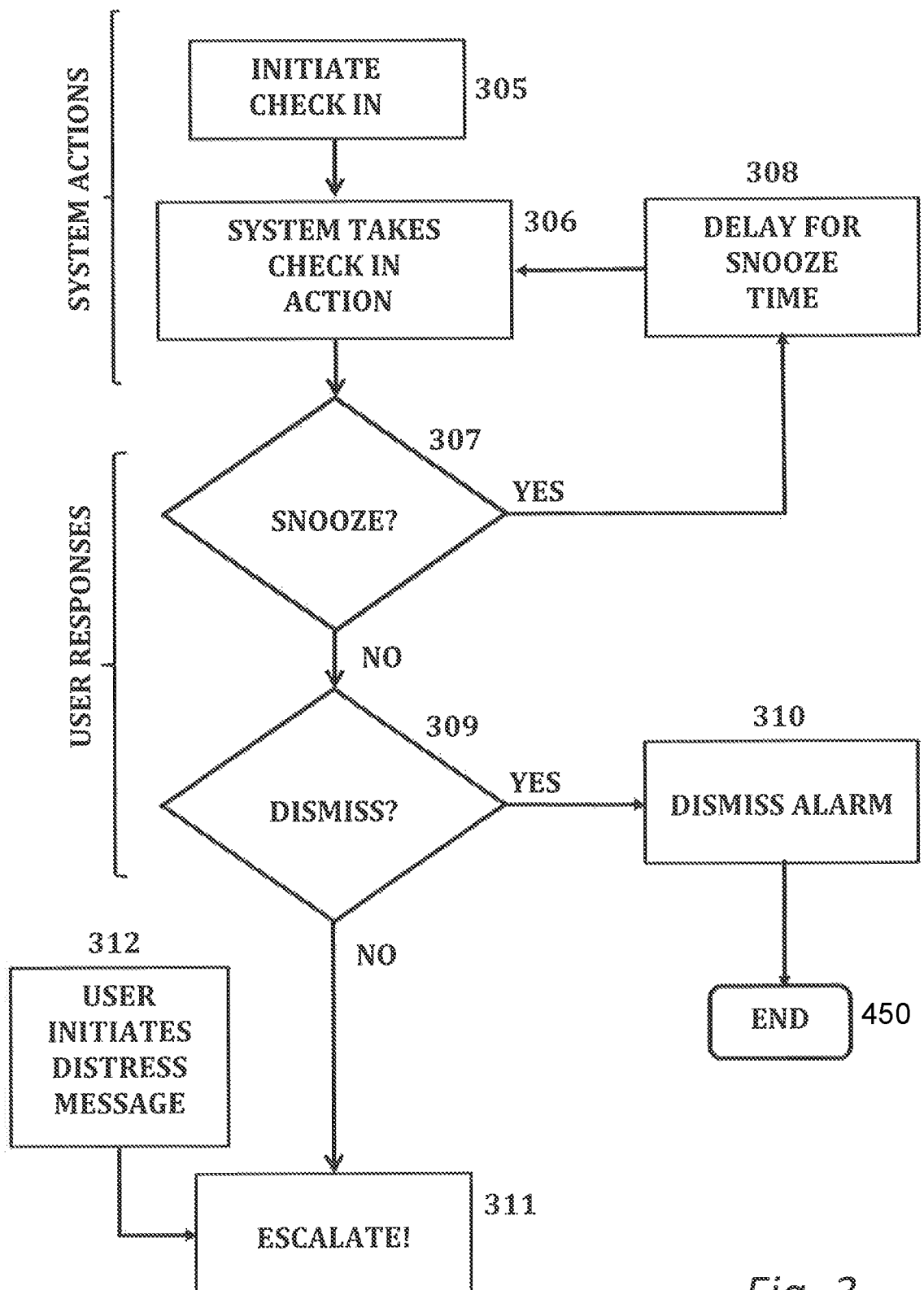
FIG. 3 depicts a flowchart of an embodiment of the system of the invention, depicting the predetermined action steps and the system responses to possible user replies, including a no-reply condition.

Referring now to FIG. 3, once time has arrived to initiate check-in procedure 305, in a next step 306 the system reads from non-transitory computer readable media the instructions created by the system when the user entered alarm information in step 301 and executes those to perform the steps as entered by the user in step 301 (not shown in FIG. 3, but shown in FIG. 2). These steps may be, but are not limited to, any of the following: 1) place a phone call to the user; or 2) send a text message to the user.

Still referring FIG. 3, the system proceeds as desired by the user to place a phone call to the user, send a text message to the user or to check in with the user in any other means identified by the user 306. The system then waits for a response from the user for a designated time period. The designated time period is programmable to a predetermined value and may be one of the alarm characteristics entered into the system in step 301. The system waits for a response by waiting to receive a return phone call or text from the user. The user may be required to enter their PIN in the case where a return text has been selected as the users choice for responding to the check-in message transmitted by system of the invention. Thus, if the user is in distress, an adverse party cannot respond to the check-in message unless they know the user's PIN without triggering the system to escalate an alert event. If the user is forced to provide their PIN, they may provide their PIN in reverse order of digits to signal that they are in distress.

Still referring to FIG. 3 there are at least four possible user responses to a check-in message from the system period. First, the user may select to respond with a SNOOZE message 307. When the system receives a SNOOZE response from a user, the system will set a timer, delay for a specific time 308, and repeat the check in action 306. This feature is useful in the case when a meeting has taken longer than the user had anticipated but there is no distress or other danger to the user, and the user wishes the system to check back in with them at a later time. Secondly, the user may elect to respond the check-in message with a DISMISS response. When the system receives a DISMISS response from a user 309, the system dismisses the alarm 310 and the check-in sequence ends for the subject alarm 450. It is to be noted that a user may have a plurality of alarms running at any given time, each with their own parameters as may be entered in step 301. The user may enter any number of alarms, each having similar or different alarm information, in step 301. Thirdly, when the system receives a directly initiated DISTRESS message 312 from a user, it immediately escalates an alert event. The system may receive a directly initiated alarm 312 by providing, or a user providing, their reverse PIN in response to a check-in message, or by activating a button on a personal electronic device such as a cell phone, tablet computer, PDA or other device that is connected to the Internet and is capable of executing non-transitory computer readable instructions stored in non-transitory computer reader media to perform the steps described herein. A fourth potential response from the user is NO RESPONSE. When a user does not respond to a check-in message provided by the system within the time allowed for response, an alarm event 311 may be escalated.

The system responds to an alert event escalation by taking the steps entered by the user when the user established the alarm in step 301 (not shown in FIG. 3 was shown in FIG. 2). Alert event escalation steps may include telephone contact with a person or persons designated by the user, telephone contact with law enforcement, emergency telephone contact such as 911 or E911, or any other contact via electronic means such as Internet connection or by telephonic means such as telephone or other connections. In this manner, the system will alert the person or persons, including but not limited to personal contacts in law enforcement, designated by the user when the user establish the alarm information in step 301. The server may effectuate these communications automatically, or may provide a message to a call center that is manned by individuals who may place telephone calls, text messages, and other communications as was designated by the user when the user establish the alarm information instead of 301.

In the case where system and method of the invention are implemented in an application comprising non-transitory computer executable instructions stored in computer readable media on a user's mobile computing device, a password may be required to gain entry to the application. This password may be separate from the users PIN. Thus, in this embodiment of the invention, the system may not be disarmed by simple entry of a password; the PIN must be used to disarm the alarm.

Figure 4A:
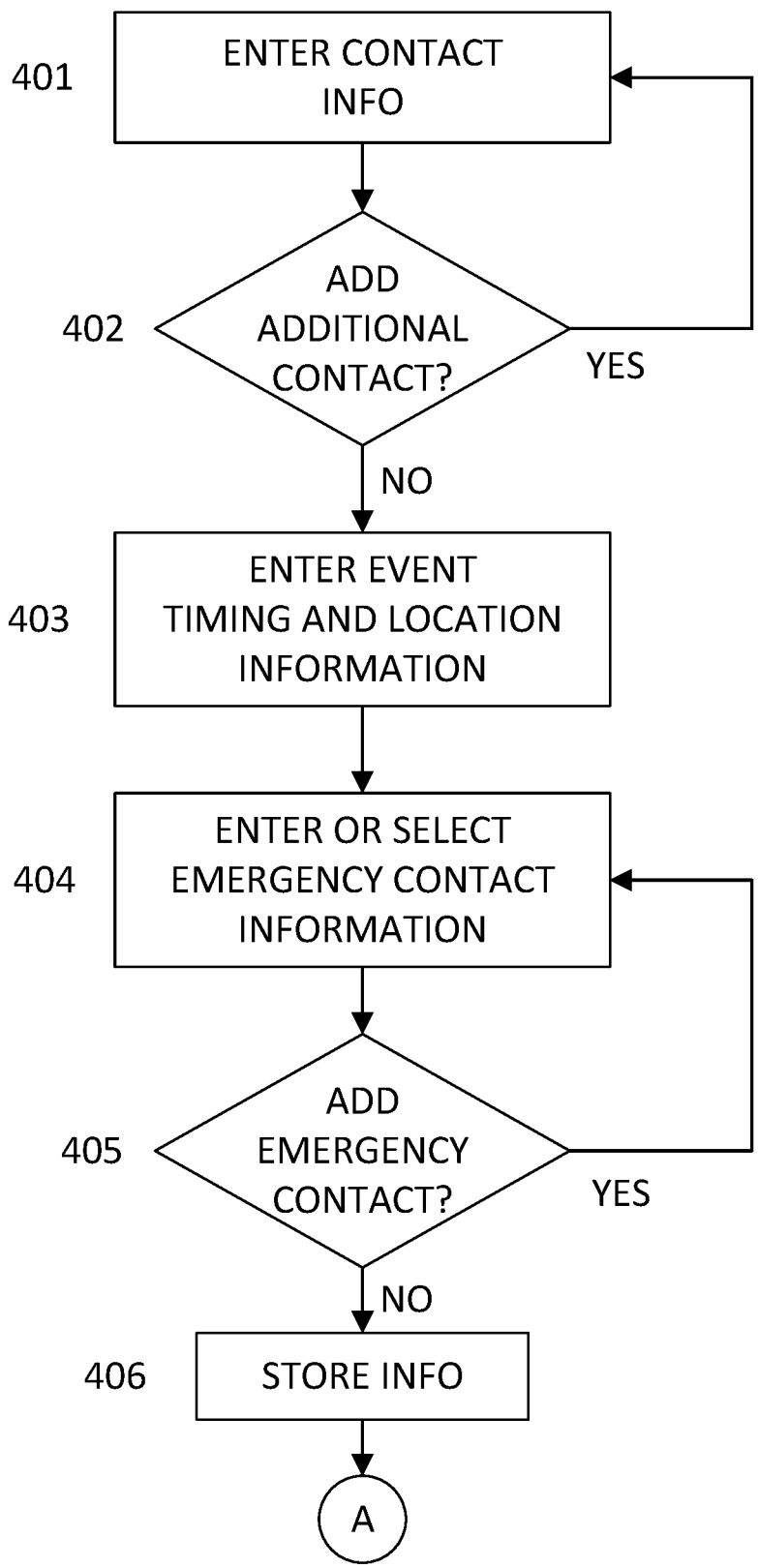
FIG. 4A depicts a flow diagram of steps of the invention for entering contact information.

Referring now to FIG. 4A, a flow diagram of steps of the invention for entering contact information is depicted in further detail. In step 401, a user indicates that he/she desires to enter contact information, and enters the identifying indicia for the contact. In the next step 402, the user is queried if more than one contact is desired to be entered. This would occur, for example, when a user has scheduled an event, such as a meeting, with more than one person. If it is desired to enter more than a single contact for an event, the user answers YES and proceeds to enter the additional contact's identifying indicia. This process is repeated until all contacts' identifying indicia have been entered, whereupon the user will answer NO to the query of step 402. Next, in step 403, event information is entered. Once event information has been entered, emergency contact information is entered directly, or selected from a pre-stored contact database, in step 404. As it is possible to enter more than a single emergency contact for an event, the user is queried in step 405 if there are additional emergency contacts to enter. If the user indicates YES, additional emergency contact information is entered until all emergency contacts have been entered, whereupon the user will respond NO to the query of step 405. In step 406, all data entered by the user is stored in non-transitory media that is either a part of, or in communication with, server 101.

Figure 4B:
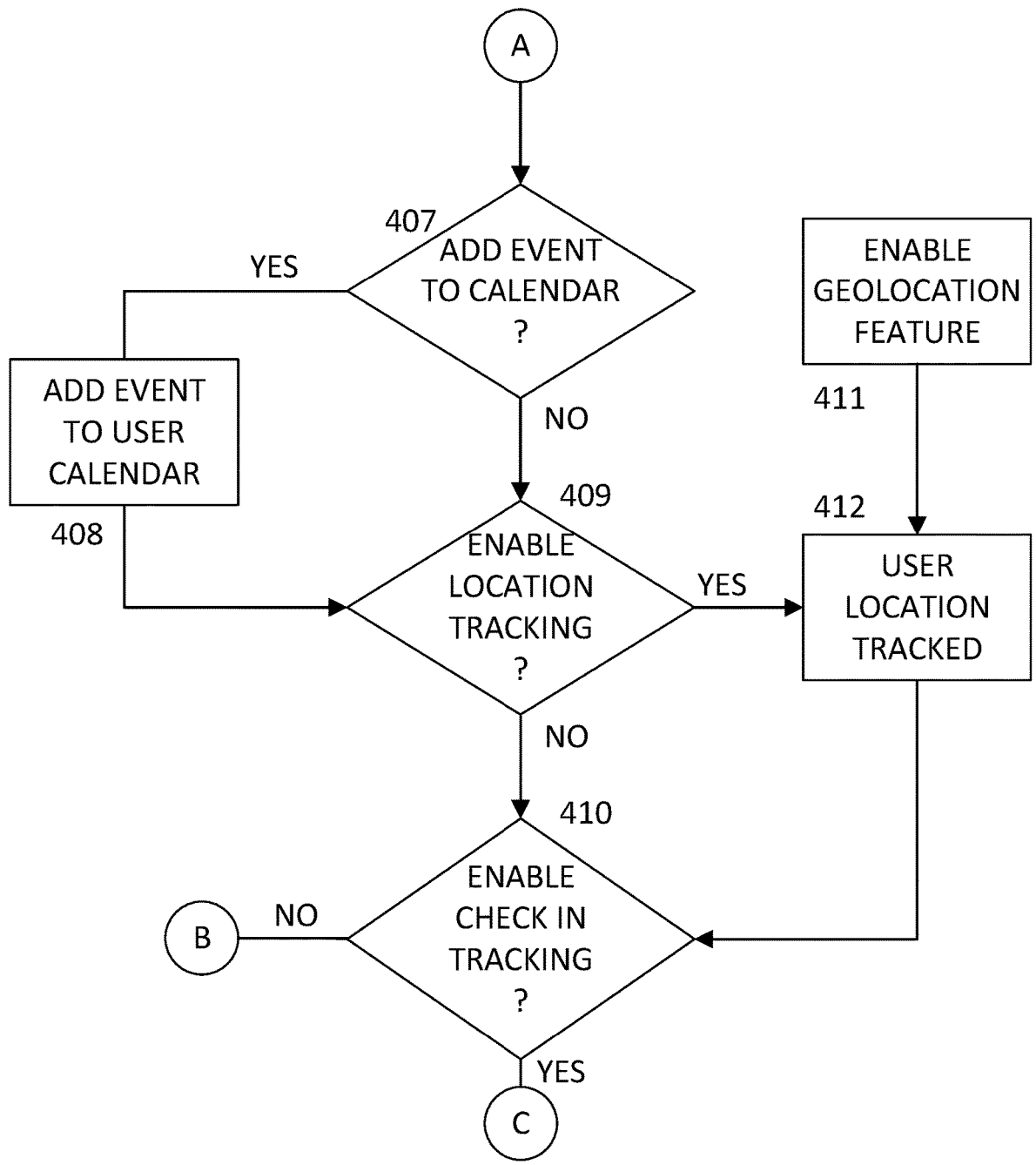
FIG. 4B depicts a flow diagram of steps of the invention for adding events to a user's electronic calendar and for enabling geolocation tracking.

Referring now to FIG. 4B, a flow diagram of steps of the invention for adding events to a user's electronic calendar and for enabling geolocation tracking is depicted. It is known in the art that many, if not most, computers, cell phones or other mobile electronic devices are equipped with calendaring functions allowing a user to store calendar events. These calendaring functions typically also provide an option for alerting a user prior to a calendared event so that the user does not miss an event. In step 407, user 100 is presented with a query as to whether the user desires to add an event to the user's electronic device calendar. For example, if the user has entered an event using user data terminal 105, the query will ask whether user 100 wishes to add the event to the user's calendar function residing on the user's cell phone. User 100 may indicate YES, in which the event information is added as a calendar event to the user's electronic calendar residing on user data terminal 105 in step 408. If user 100 indicates NO, no calendar information is stored in the user's electronic calendar. In step 409, the user is queried as to whether geolocation tracking is desired. Geolocation tracking may be provided by any means such as Global Positioning System (GPS) receivers integrated into user data terminal 105, triangulation using radio frequency communication links, or any other geolocation means. If user 100 indicates YES to the inquiry of step 409, and if the geolocation function of personal electronic device 106 has been enabled in step 411, personal electronic device 106 begins to communicate personal electronic device 106's geographic location information to server 101, whereupon server 101, in step 412, maintains information identifying the geolocation of user 100. This information may be stored and utilized to analyze personal electronic device 106's physical movements over time. It may be assumed that user 100 and personal electronic device 106 are co-located; as would be the case, for example, if personal electronic device 106 is a mobile phone and is being carried on user 100's person. In step 410, user 100 may be presented with a query as to whether user 100 desires server 101 to monitor user 100's geographic location and to take certain actions when user 100 arrives at the event location, or in proximity thereto, or when user 100 leaves the event location. If user 100 desires such check-in tracking, he/she indicates YES to the query of 410; if user 100 does not wish actions to be taken by server 101 upon their arrival at or near the event location, or their departure from the event location, they indicate NO to the inquiry of step 410.

Figure 4C:
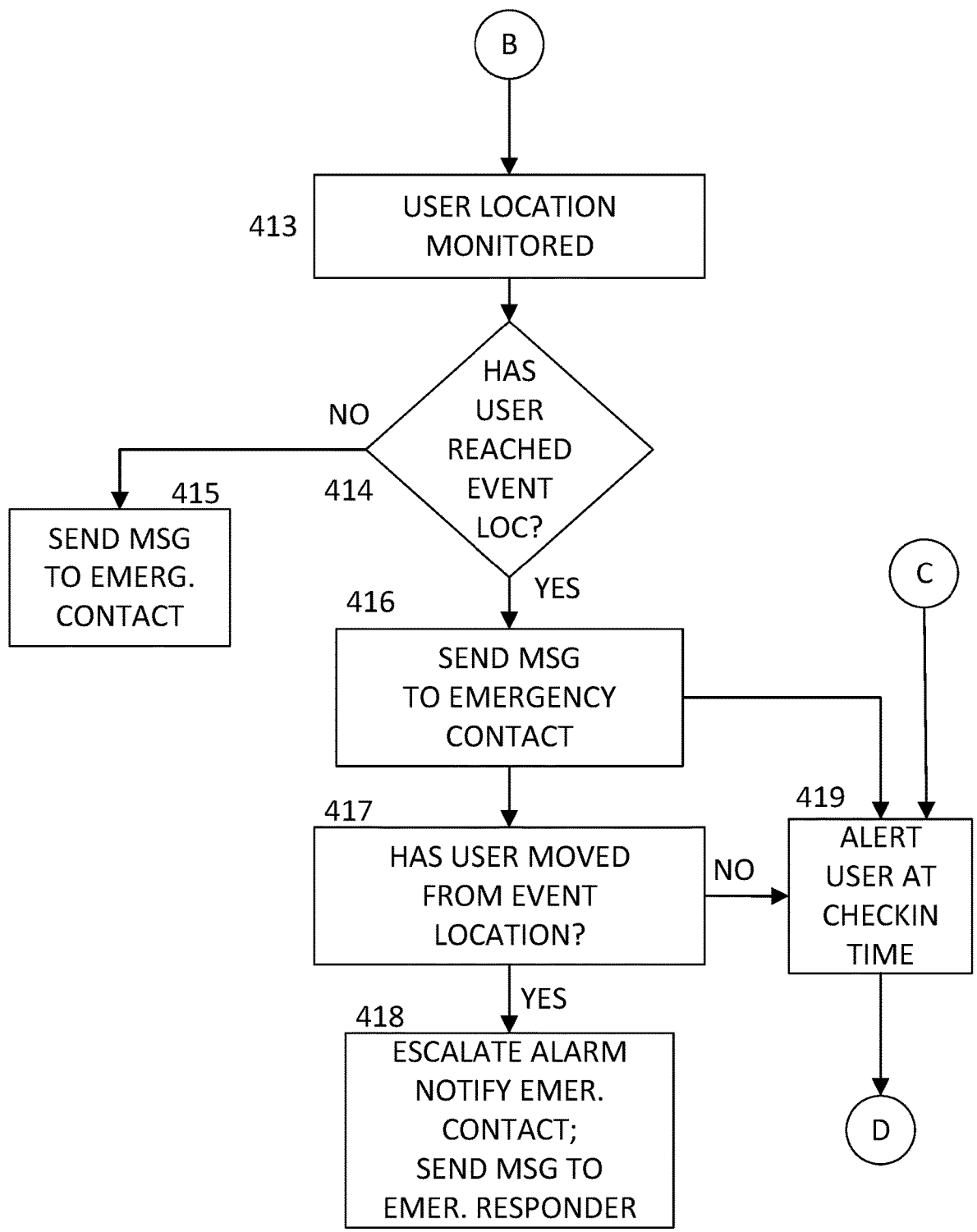
FIG. 4C depicts a flow diagram of steps of the invention for monitoring whether a user has arrived at, or moved from, an event location.

Referring now to FIG. 4C, a flow diagram of steps of the invention for monitoring whether a user has arrived at, or moved from, an event location is depicted. If a user has indicated YES to the inquiry of step 410, the user's geographic location is transmitted from personal electronic device 106 to server 101, whereupon server 101 monitors user 100's geographic location in step 413. User 100's geographic location is monitored by server 101 to ascertain whether user 100 has arrived at or near a scheduled event location in step 414. If user 100 has not reached a scheduled event location within a predetermined time of the event, a message indicating that user 100 has not arrived at an event location is transmitted to the at least one emergency contact for that event in step 415. If user 100 does arrive at an event location within a predetermined time of the scheduled event, server 101 transmits either an SMS or pre-corded audio telephone message to the designated emergency contacts for that event in step 416, indicating that user 100 has arrived at the designated event location within a predetermined time of the scheduled event. This provides confirmation that user 100 has arrived for their event as expected. Server 101 continues to monitor user 100's geographic location. If user 100 does not move from the event location 417, server 101 transmits a check-in alert to user 100 in step 419. If user does move from the event location 418, server 101 may escalate an alarm by transmitting an alarm message to the designated emergency contacts for that event and also transmits an emergency message to an emergency responder using, for example, 911 or E911 if in the United States or other jurisdiction using such emergency codes.

Figure 4D:
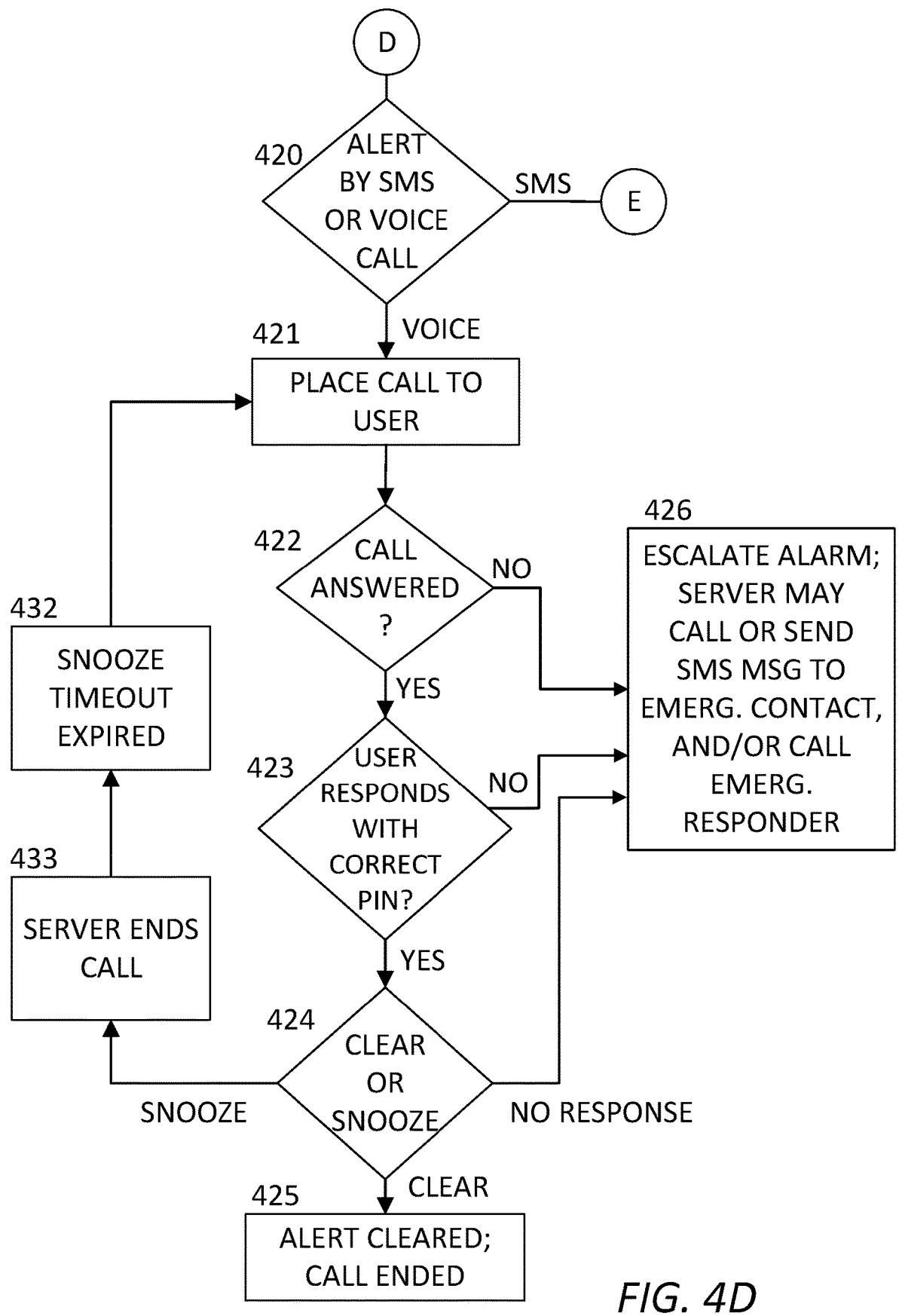
FIG. 4D depicts a flow diagram for check-in with a user by calling a user's cell phone.

Referring now to FIG. 4D, a flow diagram for check-in with a user by calling a user's cell phone is depicted. When it is desired to escalate an alarm for the case in which a user is carrying an electronic device that is capable of receiving voice calls, such as a cell phone or other device, the server decides, in step 420, whether to check-in with a user using a voice call or non-voice message such as, for example, an SMS or text message. In the case where server 101 elects to check-in with the user by voice call, it will place a voice call 421 to the user's personal electronic device 106, which may be, for example, a mobile phone. If user 100 answers the call, step 422, the user may be presented with a pre-recorded message requesting that the user enter the PIN into the personal electronic device data entry device, which may be, for example, keypad or touchscreen. If user 100 enters the correct PIN, the user is presented with an option to clear the check-in alert by entering a code using the personal electronic device's keypad, or to elect to SNOOZE for a pre-determined period of time, for example fifteen minutes, by entering a specific code into the personal electronic device keypad. For example, the user may be presented with an audio message stating "to clear check-in alert, press 1: to snooze for fifteen minutes, press 2". If user 100 enters the code to clear the alert, the user's personal electronic device transmits the clear code to server 101, whereupon server 101 clears the alert and ends the call 425. If user 100 enters the code for SNOOZE, the user's personal electronic device 106 transmits the snooze code to server 101, whereupon server 101 ends the call in step 433, waits for the SNOOZE timeout period to expire in step 432, and returns to step 421 at the end of the pre-determined SNOOZE time, repeating the call-based check-in process. If user 100 fails to answer the check-in call in step 422, or if the user does not respond with the correct PIN (or enters an incorrect PIN after a predetermined number of attempts, for example three attempts) in step 423, or 424 user 100 fails to respond to the request to the user to either enter a code for clearing the alert or enter a code for electing to SNOOZE, an alarm is escalated in step 426, in which server 101 may transmit a non-voice message or place a phone call, or both, to the at least one emergency contact, and may also place a call to an emergency responder, whereupon a voice message may be played to the emergency responder providing any of the user's identity, the event details and contact information.

Figure 4E:
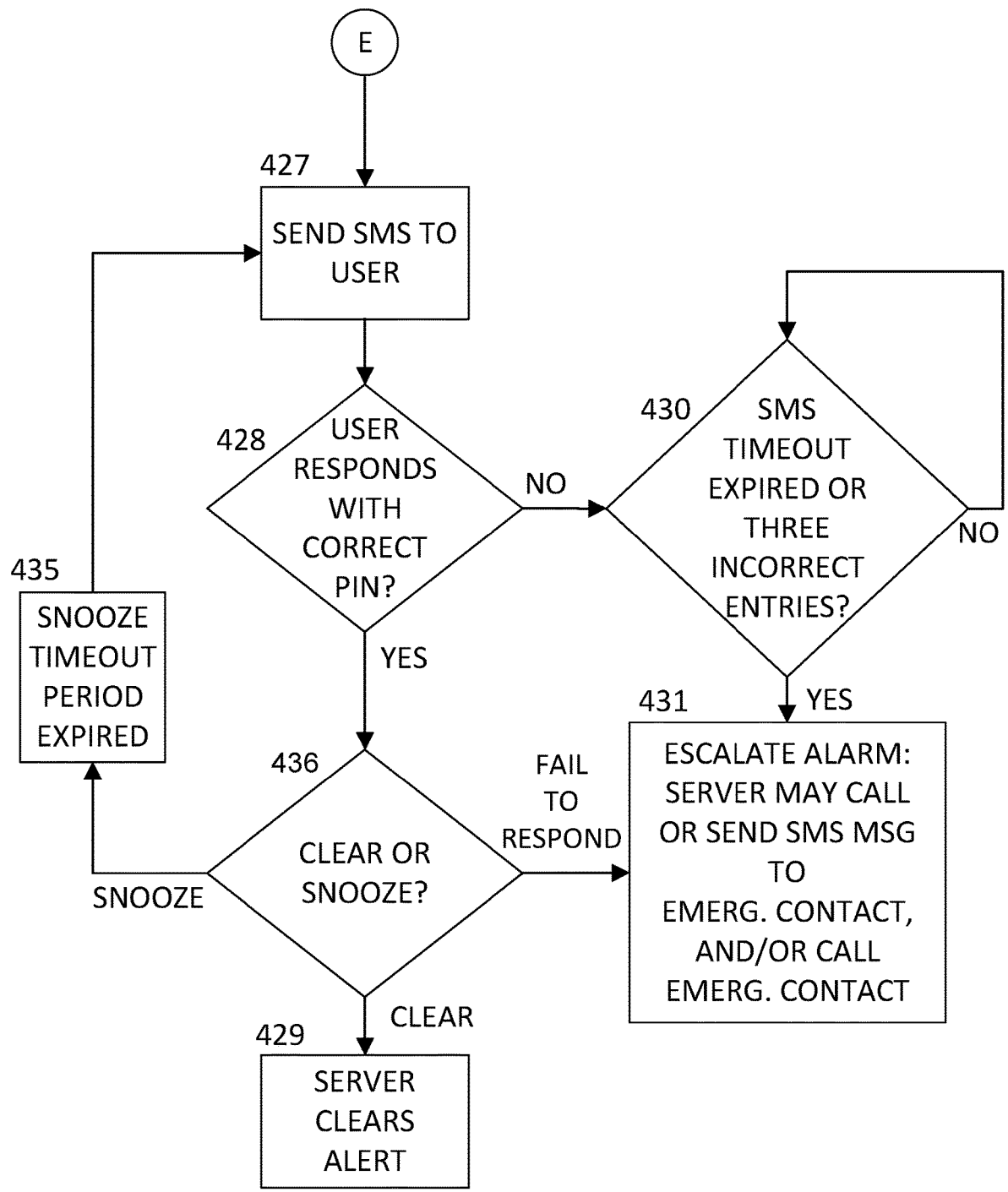
FIG. 4E depicts a flow diagram for check-in with a user by sending a message such as an SMS message or pre-recorded voice message to a user's personal electronic device, which may be any electronic device capable of receiving the message such as a cell phone, tablet or other electronic device.

Referring now to FIG. 4E, a flow diagram for check-in with a user by calling a user's cell phone is depicted. When it is desired to check-in with a user in the case in which a user is carrying an electronic device 106 that is capable of receiving non-voice messages such SMS or text messages, for example a personal electronic device or other device, server 101 may elect to check-in with user 100 by transmitting a non-voice messages such as an SMS message to the user's personal electronic device 106. In the case where server 101 elects to check-in with the user by non-voice message, it will transmit a non-voice message to the user's personal electronic device, step 427, prompting user 100 to enter a PIN into a keypad of user 100's personal electronic device. If user 100 enters the correct PIN in step 428, the user's personal electronic device may transmit the code to server 101, whereupon server 101 may clear the alert in step 429; or, in an alternate embodiment, server 101 may transmit an SMS message to the user, presenting user 100 with an option to enter a code to elect to clear the alert by entering a specific code into the personal electronic device keypad, or to elect to SNOOZE for a pre-determined period of time, for example fifteen minutes by entering a specific code into the personal electronic device keypad. If user 100 enters the SNOOZE code into the personal electronic device keypad in step 436, the user's personal electronic device transmits the snooze code to server 101. For example, the user may be presented with an SMS message stating "to clear check-in alert, press 1: to snooze for fifteen minutes, press 2". If user 100 enters the code to clear the alert, the user's personal electronic device 106 transmits the clear code to server 101, whereupon server 101 clears the alert 429. If user 100 enters the code for SNOOZE, the user's personal electronic device 106 transmits the snooze code to server 101, server 101 may wait for a predetermined SNOOZE timeout period to expire in step 435, then return to step 427 at the end of the pre-determined SNOOZE time, repeating the non-voice-based check-in process. If user 100 fails to respond with the correct PIN in step 428, or enters an incorrect PIN after a predetermined number of attempts, for example three attempts in step 430, or if user 100 fails to respond to a request to the user to either enter a code for clearing the alert or enter a code for electing to SNOOZE, an alarm is escalated in step 431, in which server 101 may transmit a non-voice message or place a phone call, or both, to the at least one emergency contact, and may also place a call to an emergency responder, whereupon a voice message may be played to the emergency responder providing any of the user's identity, the event details and contact information.

Figure 5:
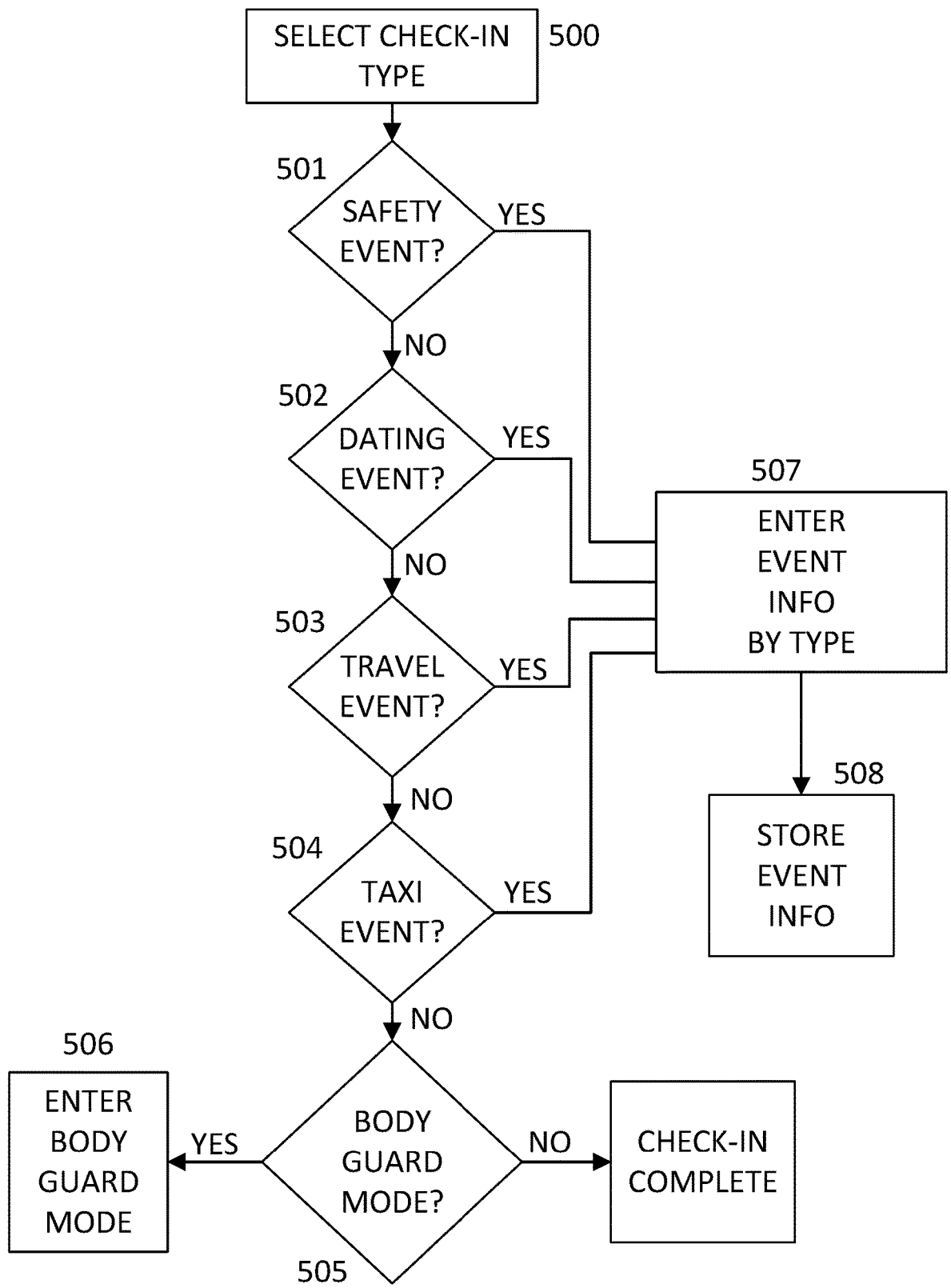
FIG. 5 depicts a flow diagram for selecting an embodiment of the invention in which a user may designate an event type is depicted.

Referring now to FIG. 5, a flow diagram for selecting an embodiment of the invention in which a user may designate an event type is depicted. In an alternate embodiment, the invention may provide a user 100 with the ability to designate the type of event that is being scheduled. These event types may have differing characteristics such that the invention may enable a user to store different types of relevant information for each type of event. For example, event types may be a 1) safety event; a 2) dating event; a 3) travel event; or 4) a taxi event. In step 500, the user may enter data indicating that they wish to designate an event type to an event. In steps 501, 502, 503, and 504, user 100 is either presented with inquiries as to the type of event being scheduled, or is provided the ability to select an event type from a pre-determined list. Once an event has been designated to be of a particular event type, user 100 may enter information specific to a particular event based on the event type in step 507, whereupon the event information is stored 508 in non-transitory computer readable media in communication with server 101. The user may also be presented with the option to select bodyguard mode in step 505, 506. If the user elects YES, geolocation information is transmitted from personal electronic device 106 to server 101, whereupon server 101 tracks user 100's location and keeps a history of user 100's movements so that if an alarm is escalated, user 100's most recent geographic position, and, optionally, a history of their movements, may be transmitted to either the designated emergency contact(s) for that event, or to emergency responder(s), or both.

Figure 6:
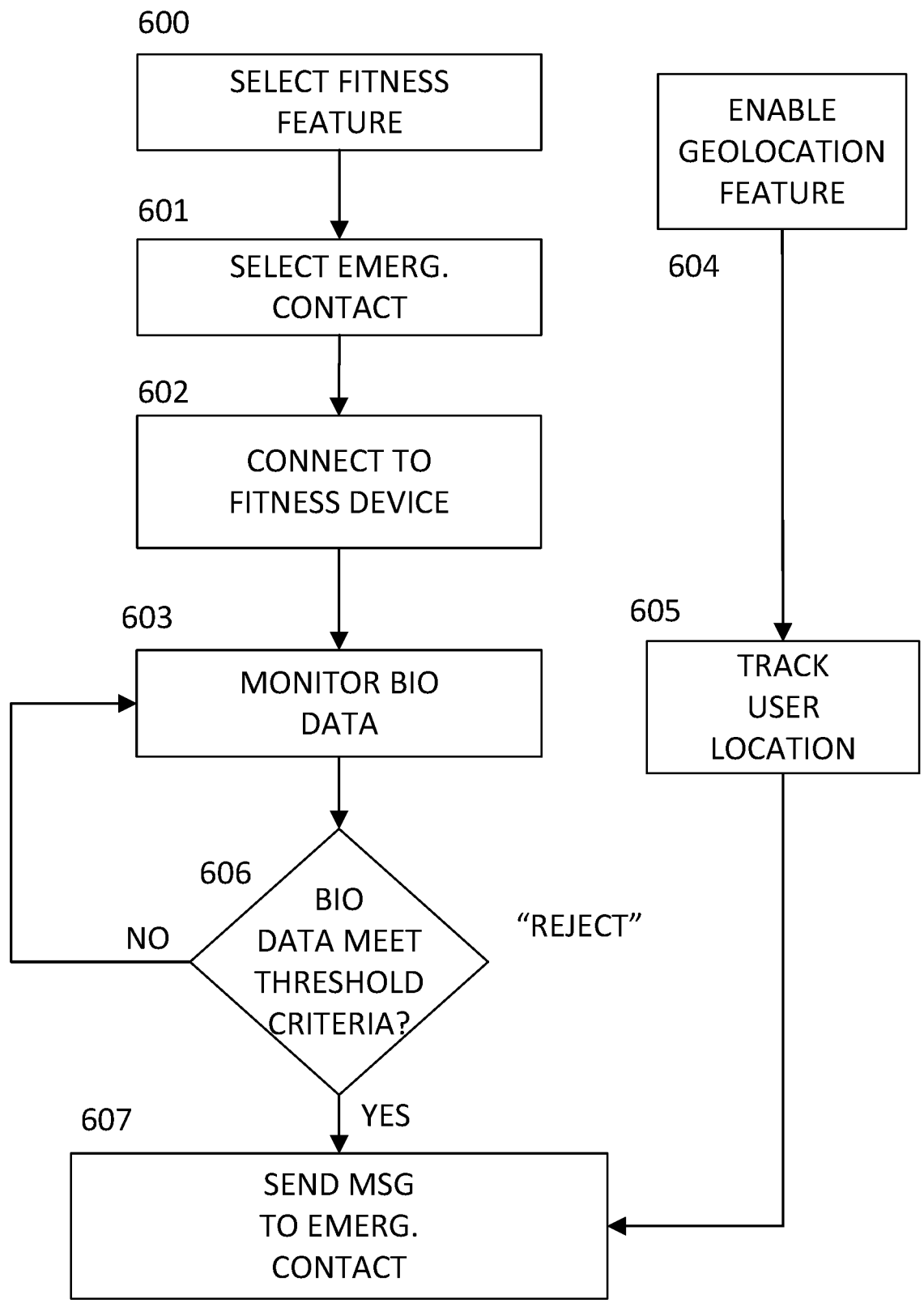
FIG. 6 depicts a flow diagram for integration with a fitness device, and for monitoring biological data of the user.

Referring now to FIG. 6, a flow diagram for integration with a fitness device, and for monitoring biological data of the user, is depicted. A fitness device is typically a wearable device, sometimes worn on the wrist, which measures biometric data for a user. The biometric data may, for example, include heart rate information. In step 600, user 100 is presented with an option to enable fitness device integration. If the user selects this option, the user may be presented with the opportunity to enter emergency contact information in step 601. This step may be repeated until all desired emergency contacts have been entered. In step 602, the personal electronic device 106, which may be, for example, a mobile phone with a transceiver adapted to communicate wirelessly with the fitness device via link 207 as shown in FIG. 1, establishes a communication link with the fitness device such that the fitness devices is enabled to transmit biometric data to personal electronic device 106. Next, in step 603, either personal electronic device 106 or server 101 monitors the user's biometric data and compares the biometric data to a predetermined threshold. If the biometric data exceeds a threshold, step 606, an alarm message is transmitted by server 101 to the at least one emergency contact in step 607. In parallel with these steps, in step 604 a user may also initiate the geolocation feature of their personal electronic device 106, whereupon user data terminal may provide the user's geolocation information in step 605 to server 101. Thus, if an alarm is transmitted in step 607, the alarm message that is transmitted to the at least one emergency contact may also include user 100's last known geographic location. As an example, if user 100 is embarking on a 10 kilometer run or bicycle ride and experiences a high heart rate event, server 101 may transmit an alarm message to the emergency contact and may also provide user 100's last known location.

Figure 7:
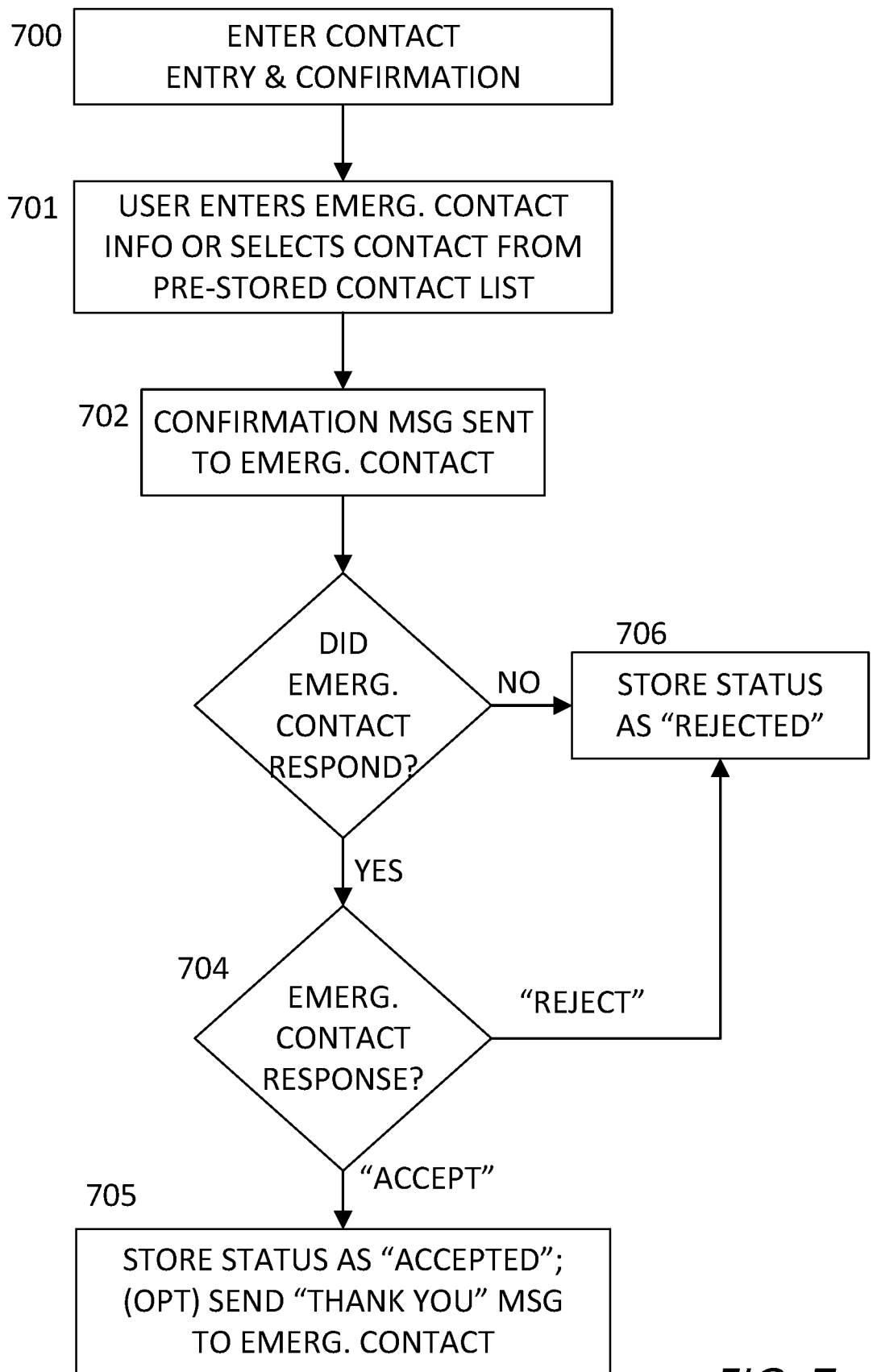
FIG. 7 depicts a flow diagram for identifying an emergency contact, and for querying a prospective emergency contact to ascertain whether the emergency contact accepts the designation of emergency contact, is depicted.

Referring now to FIG. 7, a flow diagram for identifying an emergency contact, and for querying a prospective emergency contact to ascertain whether the emergency contact accepts the designation of emergency contact, is depicted. In step 700, user 100 may be presented with the ability to identify enter emergency contacts. In step 701, user 100 enters emergency contact information, or may select a contact from a pre-existing contact database that has previously been stored on the user's user data terminal 105. For example, this may be the user's contact list stored in the user's cell phone. Once an emergency contact has been entered or selected, in step 702, server 101 may transmit a message to the prospective emergency contact. This message may be a text message, an email message, or any other message type. The prospective emergency contact may either respond or not respond, step 704. If the prospective emergency contact does not respond within a predetermined time, the prospective emergency contact is deemed to have rejected the request to be an emergency contact for the user, step 706, and that prospective emergency contact will not be utilized as an emergency contact. If the prospective emergency contact does respond, they may either respond with a "reject" or an "accept" code that is provided to them in the message sent to them in step 702. If the prospective emergency contact responds with a "reject" code, that prospective emergency contact is deemed to have rejected the request to be an emergency contact for the user, step 706, and that prospective emergency contact will not be utilized as an emergency contact. If the prospective emergency contact responds with an "accept" code, that prospective emergency contact will be added to the emergency contact list stored on server 101, and a "thank you" message may be generated and transmitted to the emergency contact, step 705.

Figure 8:
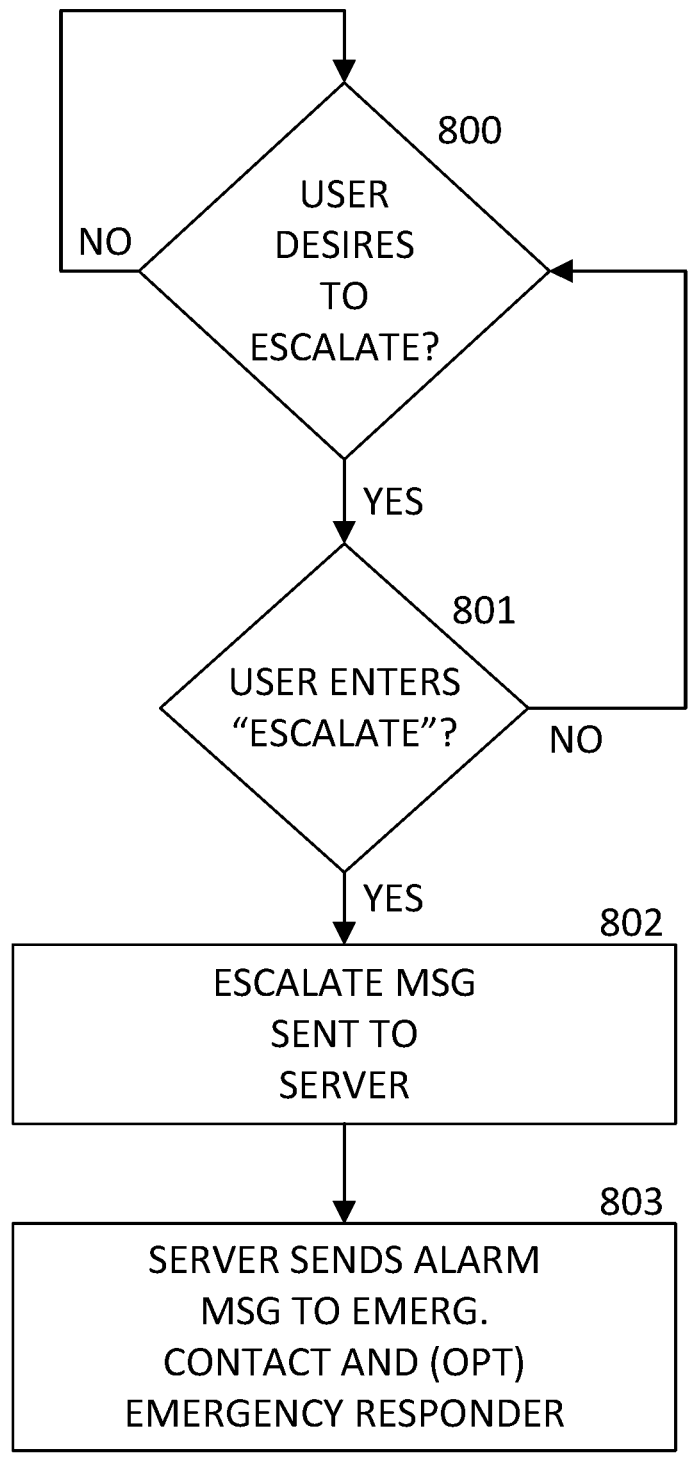
FIG. 8 depicts a flow diagram for the escalation of an alarm indicating a need for help.

Referring now to FIG. 8, a flow diagram for the escalation of an alarm indicating a need for help is depicted. The user is presented with an option to escalate an alarm, step 800. User escalation may be initiated by selecting or depressing a button for data entry presented on the touchscreen of a mobile phone that is being utilized as a personal electronic device 106, or by programming one of the physical buttons on a cell phone to act as an escalate button. If user 100 elects to escalate an alarm, they select or depress the escalate button, step 801, causing an "escalate alarm" message to be transmitted 802 from personal electronic device 106 to server 101. Server 101 then transmits an alarm message 803 to all the emergency contacts that have been designated by user 100, and server 101 also optionally transmits an alarm message to an emergency responder.

In an escalation of an alarm, an SMS or pre-recorded telephone message may be transmitted to either an emergency contact, or an emergency responder, or both, containing any one, any combination or all of the user identifying indicia, contact identifying indicia, or event information. Any alarm message, and any check-in or alert message, may be either telephone call, which may comprise a pre-recorded audio message, or may be an SMS message.

The intended scope of the invention includes the embodiments specifically described herein and all equivalents. The steps of the invention as depicted in the figures and described herein are shown in the depicted order for convenience; however, they may be performed in any order as long as the purpose of the invention is not frustrated.

INDUSTRIAL APPLICABILITY

A system and method providing for ascertaining the status of a user and escalating an alarm in the event the user is ascertained to be disposed in a dangerous condition. The of the invention attempts to contact the user at a predetermined check-in time, and notifies a pre-designated third-party which may be an emergency responder such as law enforcement or other emergency contact in the event that the user fails to respond to the check in request or signals that they are in danger using an escalate feature of the invention. The system operates autonomously to notify pre-designated emergency contacts or emergency responders in the case in which a user has been rendered unable to respond. The user may identify specific individuals with whom they plan to meet and the invention may also track the user's geolocation. The invention may also monitor biometric data of the user.

The system and method of the invention provide notification to emergency contacts and emergency responders at a pre-determined time relative to a known event such as a meeting, date, or other event. The method and system of the invention allow for a greatly reduced timeframe for emergency response, which is likely to have a significant positive impact on the probability that an emergency responder, such as law enforcement officers, will be able to successfully intervene and resolve a dangerous event before the event escalates beyond control, or before a victim has been seriously injured or taken.

I claim:

1. A system for ascertaining a status of a user and escalating an alarm to a third party, comprising at least one predetermined emergency contact, when the user is in a dangerous situation, without the need for the user to take an affirmative action to escalate the alarm, comprising:
  a server in communication with the user's personal electronic device, said server also in communication with a telephone system, and said server comprising a controller in communication with a server non-transitory computer readable media;
  wherein a check-in time has also been received by the controller from said user via said user's personal electronic device and stored in said server non-transitory computer readable media; and
  wherein event information has also been received by the controller from said user via said user's personal electronic device and stored in said server non-transitory computer readable media, wherein said event information comprises a location of a prospective meeting with a contact, a time and date of said meeting, and contact identifying indicia; and
  wherein said contact identifying indicia has also been received by the controller from said user via said user's personal electronic device and stored in said server non-transitory computer readable media, wherein said contact identifying indicia comprises contact name, telephone number and address of said contact;

wherein said personal electronic device comprises a geolocation receiver for determining and producing user geographic location information for said personal electronic device, and wherein said geolocation receiver is in communication with a controller of said personal electronic device, and wherein said controller is in communication with a non-transitory computer readable media comprising non-transitory computer executable instructions for reading said user geographic location information from said geolocation receiver and transmitting said user geographic location information to said server;

wherein said server non-transitory computer readable media also comprising instructions for receiving said user geographic location information from the user's personal electronic device, determining whether the user has arrived at said location of said prospective meeting with said contact within a predetermined time of said time of said meeting, and escalating the alarm to the third party in the case in which the user has not arrived at said location of said meeting within said predetermined time of said time of said meeting;

said server non-transitory computer readable media also comprising instructions for transmitting at said check-in time a telephone call to said user's personal electronic device, said telephone call comprising said pre-recorded audio message to said user's personal electronic device; and escalating said alarm to said third party in an event indicating said dangerous situation when said user does not answer said check-in telephone call, or in the event said user does not enter a correct personal identification number when prompted to do so by said pre-recorded audio message; and wherein said escalation of said alarm to said third party is further defined as transmission of a message to said third party, said message comprising user identifying indicia of said user, said contact identifying indicia, said user geographic location and said event information; and wherein said user identifying indicia comprise at least one of the user's name, age, physical address, email address, telephone number, photograph, or other user identifying information.

2. The system of claim 1, wherein said message is an SMS message to said at least one predetermined emergency contact.

3. The system of claim 2, inserting said user geographic location information into said SMS message, so that said SMS message further comprises information identifying the personal electronic device's geographic location.

4. The system of claim 3, wherein said server computer readable media further comprises instructions for monitoring said personal electronic device's geographic location and transmitting an arrival SMS message to said at least one predetermined emergency contact when said user has arrived within a predetermined distance from said location of said prospective meeting with said contact, said arrival SMS message indicating that said user has arrived at said location.

5. The system of claim 3, wherein said server computer readable media further comprises instructions for monitoring said personal electronic device's geographic location and transmitting a departure SMS message to said at least one predetermined emergency contact when said user has moved at least a predetermined distance from said location of said prospective meeting with said contact, said departure SMS message indicating that said user has departed said location.

6. The system of claim 3, wherein said personal electronic device further comprises a transceiver for wireless communication with a fitness device, and wherein said personal electronic device computer readable media further comprises instructions for receiving user biometric data from said fitness device, and wherein said personal electronic device transmits a fitness alarm message to said at least one predetermined emergency contact by SMS message or by a telephone call transmitting a pre-recorded message in the case of said user biometric data exceeding a predetermined threshold.

7. The system of claim 3, wherein said personal electronic device computer readable media further comprises instructions for transmitting an SMS message to said at least one predetermined emergency contact by selecting a button on a touch screen of said personal electronic device.

8. The system of claim 3, wherein said personal electronic device further comprises a calendar function for displaying a user's calendar of events on a video display of said personal electronic device, and wherein said personal electronic device computer executable instructions further comprises instructions for adding said time and date of said meeting to said calendar function.

9. The system of claim 1, wherein said message is further defined as a pre-recorded audio message via a telephone call to at least one emergency responder.

10. The system of claim 9, wherein said pre-recorded audio message comprises said user identifying indicia, said contact identifying indicia and said event information.

11. The system of claim 10, wherein said personal electronic device comprises said geolocation receiver for determining and producing said user geographic location information for said personal electronic device, and wherein said geolocation receiver is in communication with said controller of said personal electronic device, and wherein said controller is communication with a non-transitory computer readable media comprising non-transitory computer executable instructions for reading said user geographic location information from said geolocation receiver, converting said user geographic location information to a digital audio message comprising said user geographic location information, and inserting said digital audio message into said pre-recorded audio message, so that said pre-recorded audio message further comprises information identifying the personal electronic device's user geographic location information.

12. The system of claim 11, wherein said personal electronic device computer readable media further comprises instructions for communicating said user geographic location information to said server, and wherein said server computer readable media further comprises instructions for monitoring said user geographic location information and transmitting an arrival SMS message to said at least one predetermined emergency contact when said user has arrived within a predetermined distance from said location of said prospective meeting with said contact, said arrival SMS message indicating that said user has arrived at said location.

13. The system of claim 11, wherein said personal electronic device computer readable media further comprises instructions for communicating said user geographic location information to said server, and wherein said server computer readable media further comprises instructions for monitoring said user geographic location information and transmitting a departure SMS message to said at least one predetermined emergency contact when said user has at least a predetermined distance from said location of said prospective meeting with said contact, said departure SMS message indicating that said user has departed said location.

14. The system of claim 11, wherein said personal electronic device further comprises a transceiver for wireless communication with a fitness device, and wherein said personal electronic device computer readable media further comprises instructions for receiving user biometric data from said fitness device, and wherein said personal electronic device transmits a fitness alarm message to said at least one predetermined emergency contact by SMS message or by a telephone call transmitting a pre-recorded message in the case of said user biometric data exceeding a predetermined threshold.

15. The system of claim 11, wherein said personal electronic device computer readable media further comprises instructions for transmitting an SMS message to said at least one predetermined emergency contact by selecting a button on a touch screen of said personal electronic device.

16. The system of claim 11, wherein said personal electronic device further comprises a calendar function for displaying a user's calendar of events on a video display of said personal electronic device, and wherein said personal electronic device computer executable instructions further comprises instructions for adding said time and date of said meeting to said calendar function.

17. The system of claim 1, wherein said message is further defined as transmission of a pre-recorded audio message via a telephone call.

18. The system of claim 17, wherein said pre-recorded audio message comprises said user identifying indicia, said contact identifying indicia and said event information.

19. The system of claim 18, wherein said personal electronic device comprises said geolocation receiver for determining and producing said user geographic location information for said personal electronic device, and wherein said geolocation receiver is in communication with said controller of said personal electronic device, and wherein said controller is communication with a non-transitory computer readable media comprising non-transitory computer executable instructions for reading said user geographic location information from said geolocation receiver, converting said user geographic location information to a digital audio message comprising said user geographic location information, and inserting said digital audio message into said pre-recorded audio message, so that said pre-recorded audio message further comprises information identifying the personal electronic device's user geographic location information.

20. The system of claim 19, wherein said personal electronic device computer readable media further comprises instructions for communicating said user geographic location information to said server, and wherein said server computer readable media further comprises instructions for monitoring said user geographic location information and transmitting an arrival SMS message to said at least one predetermined emergency contact when said user has arrived within a predetermined distance from said location of said prospective meeting with said contact, said arrival SMS message indicating that said user has arrived at said location.

21. The system of claim 19, wherein said personal electronic device computer readable media further comprises instructions for communicating said user geographic location information to said server, and wherein said server computer readable media further comprises instructions for monitoring said user geographic location information and transmitting a departure SMS message to said at least one predetermined emergency contact when said user has at least a predetermined distance from said location of said prospective meeting with said contact, said departure SMS message indicating that said user has departed said location.

22. The system of claim 19, wherein said personal electronic device further comprises a transceiver for wireless communication with a fitness device, and wherein said personal electronic device computer readable media further comprises instructions for receiving user biometric data from said fitness device, and wherein said personal electronic device transmits a fitness alarm message to said at least one predetermined emergency contact by SMS message or by a telephone call transmitting a pre-recorded message in the case of said user biometric data exceeding a predetermined threshold.

23. The system of claim 19, wherein said personal electronic device computer readable media further comprises instructions for transmitting an SMS message to said at least one predetermined emergency contact by selecting a button on a touch screen of said personal electronic device.

24. The system of claim 19, wherein said personal electronic device further comprises a calendar function for displaying a user's calendar of events on a video display of said personal electronic device, and wherein said personal electronic device computer executable instructions further comprises instructions for adding said time and date of said meeting to said calendar function.

25. The system of claim 1, wherein said transmission of said message to said third party is further defined as communicating an emergency message to an emergency response communication point, wherein said emergency response communication point is an E911 system.

* * * * *